United States Patent
Iwase et al.

(10) Patent No.: US 10,392,004 B2
(45) Date of Patent: Aug. 27, 2019

(54) HYBRID VEHICLE

(71) Applicant: HONDA MOTOR CO., LTD., Tokyo (JP)

(72) Inventors: Toshiyuki Iwase, Wako (JP); Masato Amano, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 60 days.

(21) Appl. No.: 15/864,370

(22) Filed: Jan. 8, 2018

(65) Prior Publication Data
US 2018/0222469 A1 Aug. 9, 2018

(30) Foreign Application Priority Data
Feb. 9, 2017 (JP) .................. 2017-021842

(51) Int. Cl.
*F01P 7/16* (2006.01)
*F02D 13/02* (2006.01)
(Continued)

(52) U.S. Cl.
CPC .............. *B60W 20/16* (2016.01); *B60K 6/50* (2013.01); *B60W 10/06* (2013.01); *B60W 10/08* (2013.01);
(Continued)

(58) Field of Classification Search
CPC ...... B60W 20/16; B60W 10/06; B60W 10/08; B60W 10/30; B60W 2510/0638; B60W 2510/0657; B60W 2510/0676; B60K 6/50; F01P 3/02; F01P 11/16; F01P 2025/13; F01P 2025/31; F01P 2025/32; F01P 2025/40; F01P 2025/44; F01P 2025/48;
(Continued)

(56) References Cited

U.S. PATENT DOCUMENTS 8,577,568 B2 * 11/2013 Sujan ................... B60W 50/14
701/103
9,205,831 B2 * 12/2015 Dextreit ................ B60K 6/448
(Continued)

FOREIGN PATENT DOCUMENTS

GB 2172717 A 9/1986
JP 2007084065 A 4/2007
(Continued)

OTHER PUBLICATIONS

Search Report for German Application No. 102018201879.0, dated Sep. 17, 2018, 8 pages.
(Continued)

*Primary Examiner* — Krishnan Ramesh
(74) *Attorney, Agent, or Firm* — Armstrong Teasdale LLP

(57) ABSTRACT

An engine (2) of a hybrid vehicle (1) is configured to operate along a prescribed operation line in an operation property diagram of the engine. In addition to a first operation line (A) that optimizes fuel economy, a second operation line (B) that minimizes undesired emission of particulate matter is defined. The two operation lines substantially coincide with each other in a certain region of the diagram. A control unit (7) of the vehicle switches the operating condition between the first operation line and the second operation line when the first operation line and the second operation line substantially coincide with each other.

6 Claims, 5 Drawing Sheets

(51) Int. Cl.

| | | |
|---|---|---|
| *B60W 20/16* | (2016.01) | |
| *B60K 6/50* | (2007.10) | |
| *B60W 10/06* | (2006.01) | |
| *B60W 10/08* | (2006.01) | |
| *B60W 10/30* | (2006.01) | |
| *F01P 11/16* | (2006.01) | |
| *F01P 3/02* | (2006.01) | |
| *F02D 29/02* | (2006.01) | |
| *F01P 3/20* | (2006.01) | |

(52) U.S. Cl.
CPC ............... *B60W 10/30* (2013.01); *F01P 3/02* (2013.01); *F01P 11/16* (2013.01); *F02D 29/02* (2013.01); *B60W 2510/0638* (2013.01); *B60W 2510/0657* (2013.01); *B60W 2510/0676* (2013.01); *B60W 2710/0644* (2013.01); *B60W 2710/0666* (2013.01); *B60Y 2200/92* (2013.01); *F01P 3/20* (2013.01); *F01P 7/16* (2013.01); *F01P 2025/13* (2013.01); *F01P 2025/31* (2013.01); *F01P 2025/32* (2013.01); *F01P 2025/40* (2013.01); *F01P 2025/44* (2013.01); *F01P 2025/48* (2013.01); *F02D 13/0203* (2013.01); *F02D 2200/021* (2013.01); *Y02T 10/6217* (2013.01); *Y02T 10/6286* (2013.01); *Y10S 903/93* (2013.01)

(58) Field of Classification Search
CPC .. F02D 29/02; Y02T 10/6217; Y02T 10/6286; Y10S 903/93
USPC .......................................................... 701/22
See application file for complete search history.

(56) References Cited

U.S. PATENT DOCUMENTS

| | | | | |
|---|---|---|---|---|
| 9,328,674 | B2 * | 5/2016 | Geveci | .................... F02D 29/02 |
| 9,610,938 | B2 * | 4/2017 | Kanno | .................... B60L 58/15 |
| 9,834,201 | B2 * | 12/2017 | Inoue | ........................ B60K 6/48 |
| 2004/0043866 | A1 * | 3/2004 | Hrovat | ................... B60W 10/02 477/100 |
| 2005/0039440 | A1 | 2/2005 | Kitahara | |
| 2010/0280740 | A1 | 11/2010 | Oe | |
| 2012/0203434 | A1 * | 8/2012 | Sujan | .................... B60W 50/14 701/64 |
| 2013/0332015 | A1 * | 12/2013 | Dextreit | ................. B60K 6/448 701/22 |
| 2015/0226135 | A1 * | 8/2015 | Geveci | ..................... F02D 29/02 701/22 |
| 2016/0046284 | A1 * | 2/2016 | Inoue | ........................ B60K 6/48 701/22 |
| 2016/0137187 | A1 * | 5/2016 | Kanno | ................... B60L 58/15 701/22 |

FOREIGN PATENT DOCUMENTS

| | | |
|---|---|---|
| JP | 2009215898 A | 9/2009 |
| JP | 2011214548 A | 10/2011 |

OTHER PUBLICATIONS

Examination Report for German Application No. 102018201879.0, dated Sep. 17, 2018, 6 pages.
Notification of Reasons for Refusal for JP Application No. 2017-021842, dated Jul. 19, 2018, 3 pages.
Written Argument for JP Application No. 2017-021842, dated Sep. 21, 2018, 3 pages.
Written Amendment for JP Application No. 2017-021842, dated Sep. 21, 2018, 5 pages.
Decision to Grant a Patent for JP Application No. 2017-021842, dated Sep. 25, 2018, 3 pages.
JP Notification of Refusal for related application 2017-021842 dated Jul. 19, 2018; 6 pp.
JP Decision to Grant a Patent for related application 2017-021842 dated Sep. 25, 2018; 6 pp.

* cited by examiner

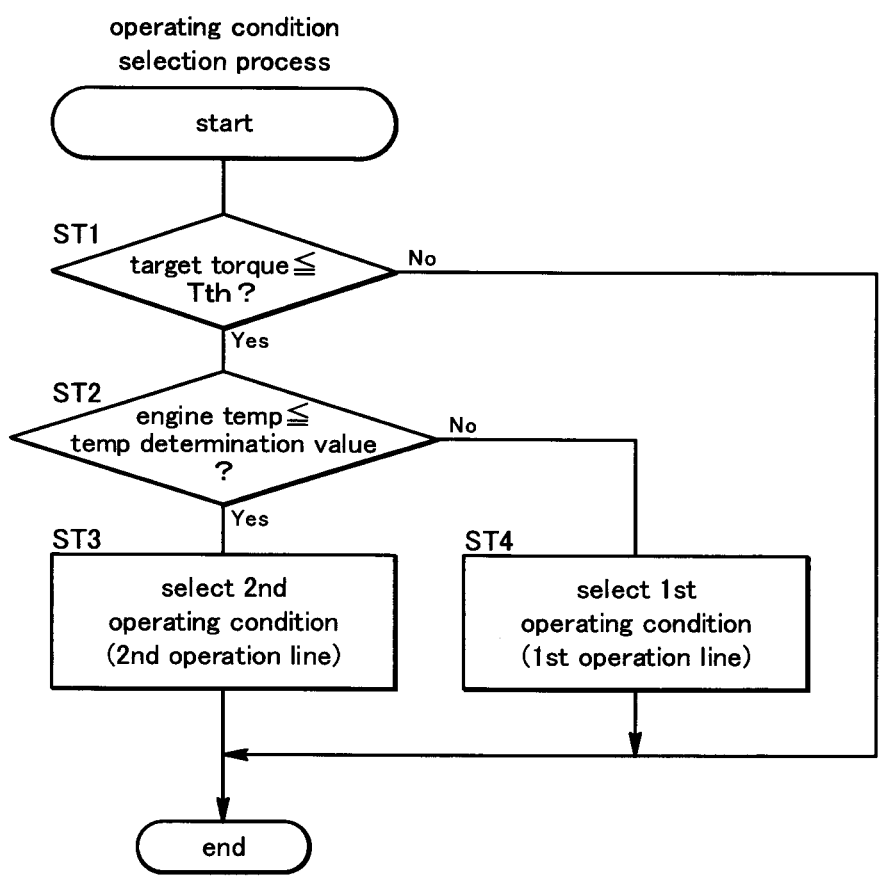

HYBRID VEHICLE

TECHNICAL FIELD

The present invention relates to a hybrid vehicle provided with a control unit for controlling the rotational speed and torque of an internal combustion engine.

BACKGROUND ART

In a hybrid vehicle equipped with an internal combustion engine, an electric motor, an electric generator and a battery, the operating condition of the internal combustion engine is controlled so as to follow an operation line defined in an operation map using the rotational speed and the torque of the engine as target parameters. JP2009-215898A discloses such a hybrid vehicle in which a plurality of operation lines are provided. An operation line configured to optimize fuel economy is normally selected, but when the available reducing agent in the exhaust gas purification system has decreased beyond a certain level, a different operation line configured to reduce NOx emission from the engine is selected at the expense of fuel economy.

However, when the operation line is changed during the operation of the engine, the characteristics of the engine may change to such an extent that a discomfort may be caused to the vehicle operator.

SUMMARY OF THE INVENTION

In view of such a problem of the prior art, a primary object of the present invention is to provide a hybrid vehicle which is capable of changing operation lines without causing any noticeable change in the operation of the engine.

The present invention achieves such an object by providing a hybrid vehicle, comprising: an internal combustion engine (2); an electric generator (4) configured to be driven by the engine; a battery (6) electrically connected to the electric generator; an electric motor (3) configured to be driven by the electric generator and/or the battery, and to drive a driven wheel of the vehicle; an engine temperature sensor (60) for measuring or estimating a temperature of the engine; and a control unit (7) for controlling the engine, the electric generator and the electric motor according to an operating condition of the vehicle including a rotational speed of the engine and a target torque of the engine; wherein the control unit controls the engine so as to operate in a first operating condition (A) under normal circumstances, and in a second operating condition (B) when the engine temperature is equal to or lower than a prescribed temperature determination value, the first operating condition and the second operating condition being selected so as to substantially coincide with each other when the rotational speed of the engine is equal to or lower than a prescribed rotational speed determination value and the target torque of the engine is equal to or lower than a prescribed torque determination value, and wherein the control unit switches the second operating condition to the first operating condition when the first operating condition and the second operating condition substantially coincide with each other.

Since the operating conditions are changed from one to the other in a region where the two operating conditions substantially coincide with each other, no change in the mode of operation of the engine takes place so that the vehicle operator is prevented from experiencing any discomfort. For instance, when a change in the operating condition is to be commanded at some point, the control unit may postpone the time point of changing the operating condition until a time point where the first operating condition and the second operating condition substantially coincide with each other.

Preferably, the engine temperature sensor comprises a cooling water temperature sensor (63) for measuring a temperature of cooling water exiting from a region surrounding a cylinder of the engine.

The temperature in the cylinder is known to have a direct bearing on the behavior of the engine. By using a cooling water temperature sensor configured to detect such a temperature, a temperature value indicative of the actual temperature in the cylinder can be detected in a simple and economical manner.

Alternatively, the engine temperature sensor may be a sensor for measuring or estimating a combustion temperature of a cylinder of the engine.

It is most desirable to directly measure the combustion temperature of the cylinder. However, it is known that the temperature in the cylinder can be estimated by analyzing the history of the operating condition of the engine. This also provides a simple and effective way for detecting the engine temperature.

The engine temperature sensor may comprise at least one of a temperature sensor for detecting a temperature of gas in a cylinder of the engine (61), a temperature sensor (63) for detecting a temperature of cooling water of the engine, a temperature sensor (65) for detecting a temperature of a main body of the engine, a temperature sensor (64) for detecting a temperature of lubricating oil of the engine, a temperature sensor (66) for detecting a surrounding part of the engine and a temperature sensor (67) for detecting a temperature of exhaust gas of the engine.

There are various ways to detect the engine temperature.

In a preferred embodiment of the present invention, the first operating condition is selected as an operating condition that optimizes a fuel economy of the engine for a given power output.

This is advantageous because fuel economy is one of the highest priorities in engine design.

In a preferred embodiment of the present invention, the second operating condition is selected as an operating condition that minimizes emission of particulate matter for a given power output when the engine is not yet warmed up.

Since the emission of particulate matter should be minimized in view of health concerns, it is desirable to select the operating condition so as to minimize emission of particulate matter even at the expense of fuel economy.

The control unit may be configured to select the second operating condition upon a start up of the engine, and switches the operating condition to the first operating condition after elapsing of a prescribed time period from the start up of the engine.

Since the engine temperature is typically low at the start up of the engine, it is advantageous to select the second operating condition following the start up of the engine. After elapsing of a certain time period typically required for the engine to adequately warm up, the operating condition may be switched to the first operating condition.

BRIEF DESCRIPTION OF THE DRAWINGS

FIG. 5 is a flowchart of an operating condition selection process for an engine of the hybrid vehicle.

PREFERRED EMBODIMENT(S)

A hybrid vehicle 1 according to an embodiment of the present invention is described in the following with reference to FIGS. 1 to 5.

Figure 1:
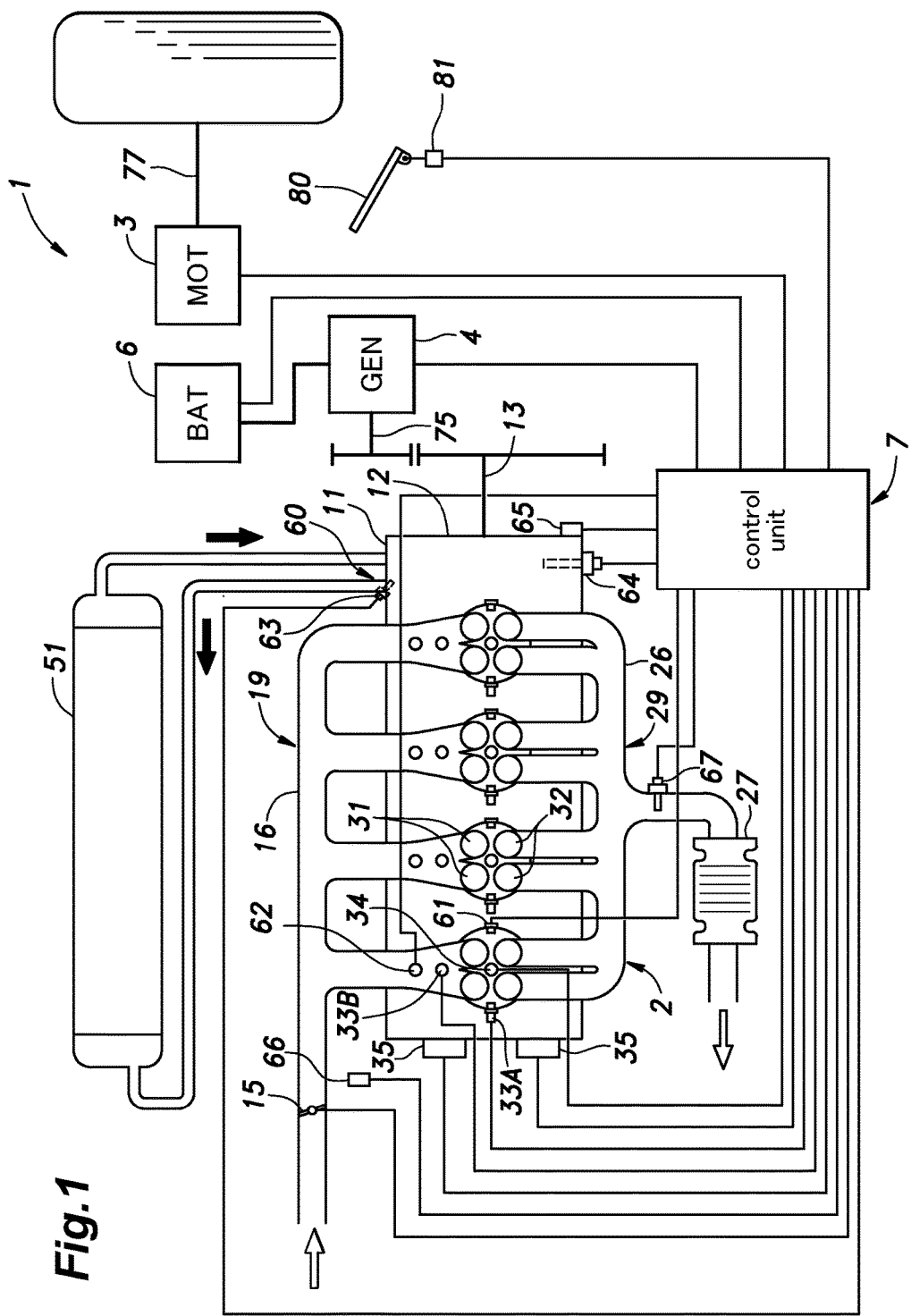
FIG. 1 is a schematic diagram of a hybrid vehicle according to an embodiment of the present invention.

As shown in FIG. 1, the hybrid vehicle 1 according to the present embodiment includes an engine 2 (internal combustion engine), an electric motor 3 (MOT), an electric generator 4 (GEN), a battery 6 (BAT) and a control unit 7.

The engine 2 consists of an in-line, four-cylinder DOHC engine, and includes an engine main body consisting of a cylinder block 11 and a cylinder head 12, and a crankshaft 13. The engine 2 includes an intake system 19 including a throttle valve 15, an intake pipe 16, and an exhaust system 29 including an exhaust pipe 26 and an exhaust purification catalyst 27. The cylinder head 12 is provided with a pair of intake valves 31, a pair of exhaust valves 32, a direct injection fuel injector 33A, and a spark plug 34 for each cylinder. In the illustrated embodiment, the cylinder head 12 is provided with a variable valve actuation mechanism 35 for variably actuating the intake valves 31 and the exhaust valves 32. The intake pipe 16 is provided with a fuel injection valve 33B for each cylinder for injecting fuel into a corresponding part of the intake pipe 16.

The engine 2 is provided with a plurality of engine temperature sensors 60 for measuring temperatures at various parts of the engine 2. In the present embodiment, the engine temperature sensors 60 include a cooling water temperature sensor 63 provided adjacent to the outlet of the cooling water passage of the engine 2 leading to a radiator 51 of the engine 2 to detect the temperature of the cooling water.

The crankshaft 13 is connected to a rotary shaft 75 of the generator 4 via a gear train. Further, the rotary shaft of the motor 3 is connected to a drive shaft 77 that drives driven wheels.

Figure 2:
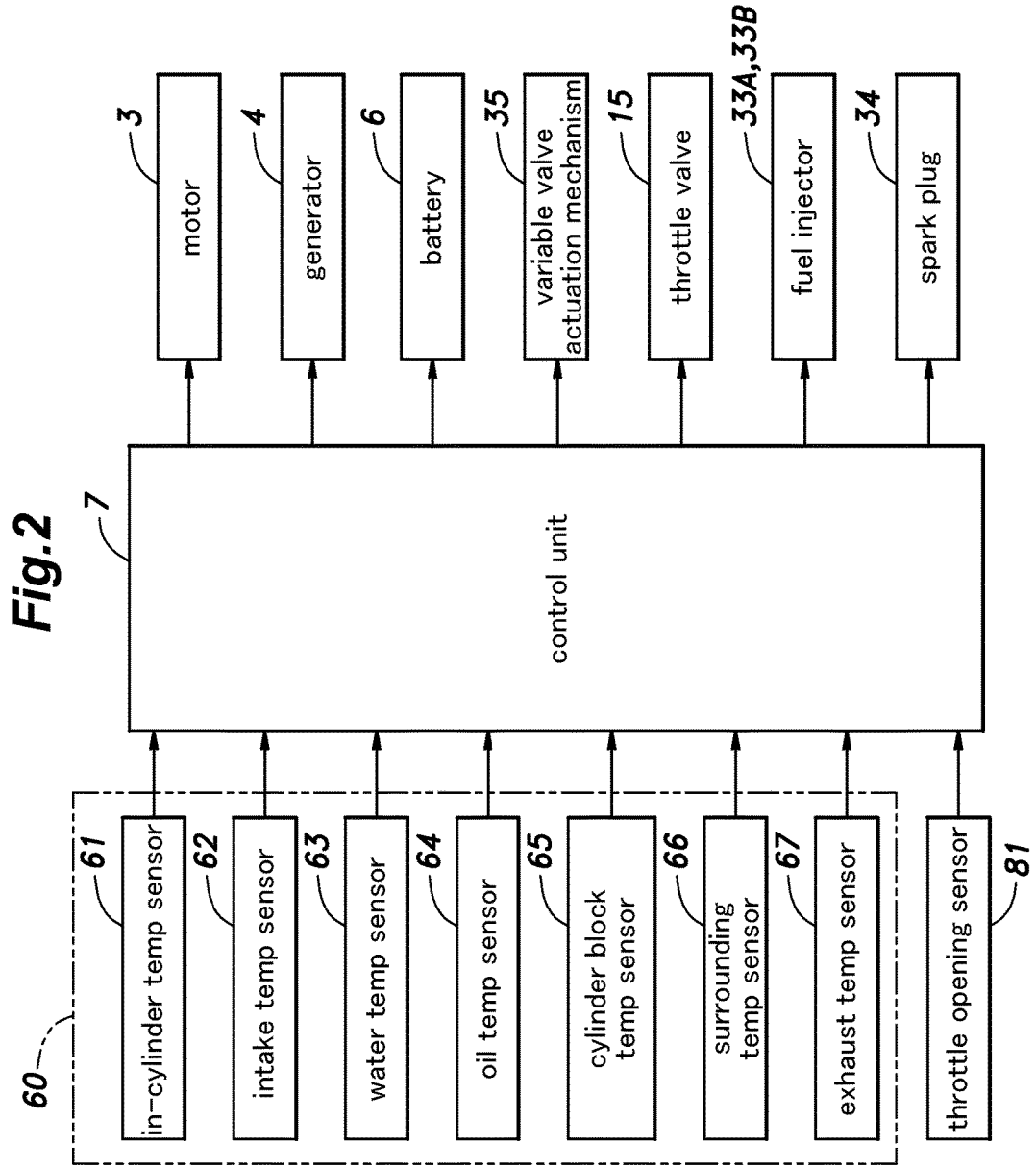
FIG. 2 is a block diagram of a control system of the hybrid vehicle.

As shown in FIG. 2, the engine 2 of the hybrid vehicle 1 includes a throttle opening sensor 81 which may consist of a sensor for detecting the depression stroke of an accelerator pedal 80, in addition to the engine temperature sensor 60, the motor 3, the generator 4, the battery 6, the variable valve actuation mechanism 35, the throttle valve 15, the fuel injectors 33A and 33B, the spark plugs 34, and the throttle opening sensor 81.

The control unit 7 is provided with a central processing unit (CPU), and memory for storing programs to be executed by the CPU, and various data such as computation results.

The control unit 7 selects the operating condition of the engine 2 based on the engine temperature acquired by the engine temperature sensors 60. The operating conditions may be represented by lines on a coordinate system (map) (hereinafter referred to as operation lines) representing different combinations of the rotational speed and the output torque of the engine 2 (for example, operation lines A and B in FIGS. 3 and 4).

Further, the control unit 7 computes the target torque of the engine according to the signal from the throttle opening sensor 81 and other sensors. When the engine 2 is providing a certain power output, the relationship between the engine rotational speed and the torque is expressed as a line on the map where the product of the torque and the engine rotational speed corresponds to the given power output. Therefore, by obtaining the intersection (target operating point) of the operation line and the line corresponding to the required power output, the target rotational speed and the target torque can be computed. The target rotational speed and the target torque correspond to the values of the vertical axis and the horizontal axis of the target operating point, respectively.

Figure 3:
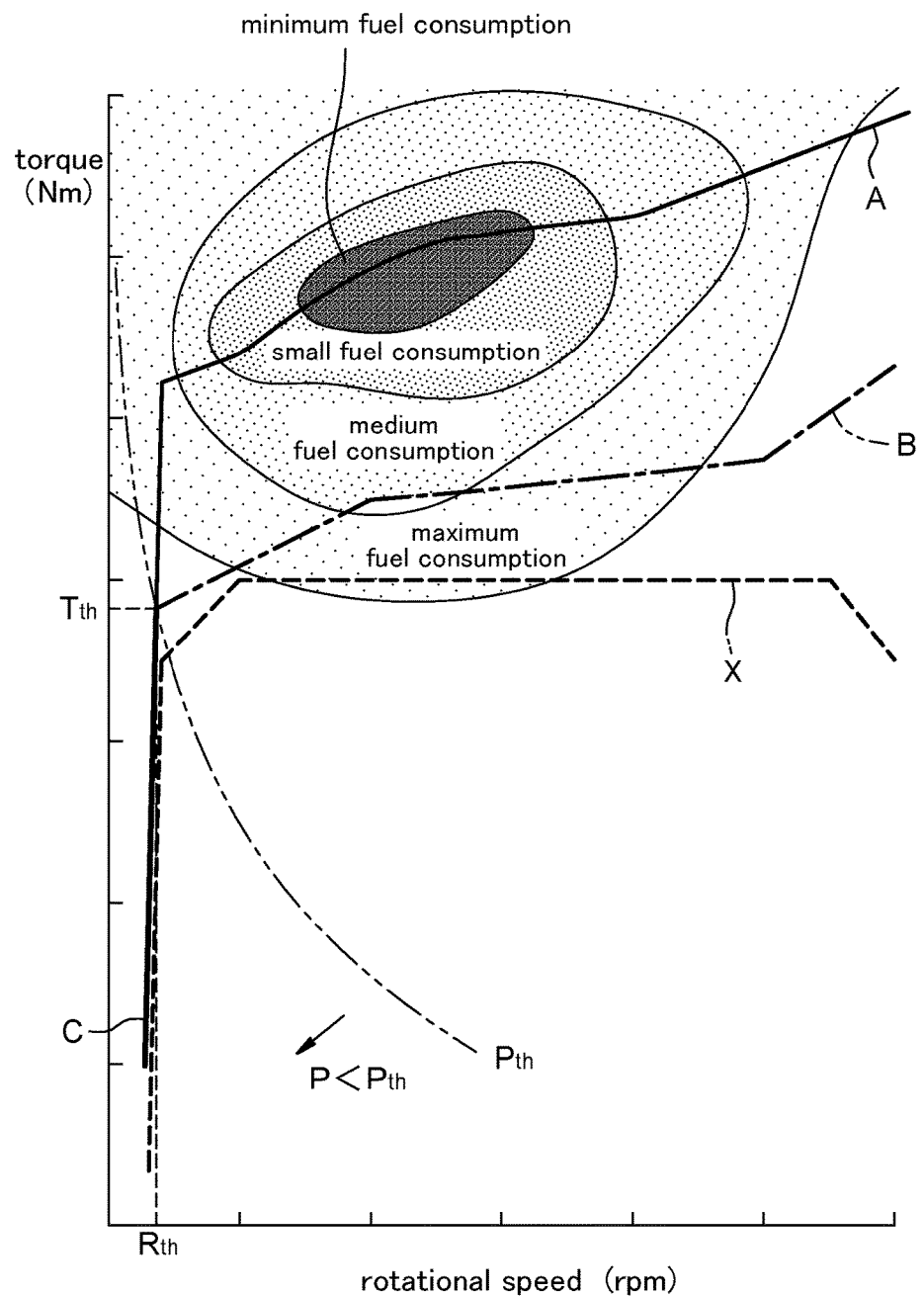
FIG. 3 is an operation property diagram of an internal combustion engine including fuel economy performance.
Figure 4:
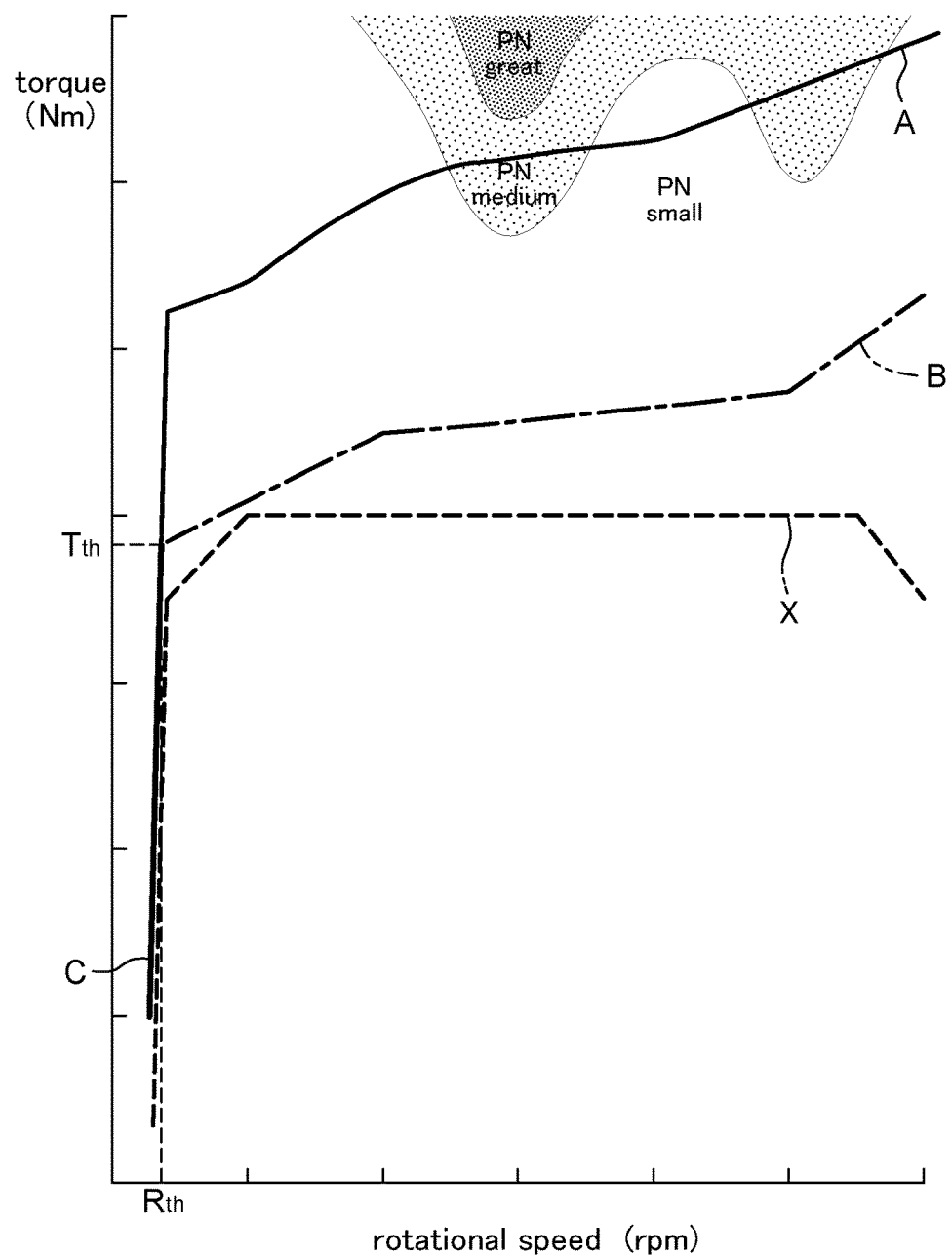
FIG. 4 is an operation property diagram similar to that of FIG. 3 including particulate matter emission performance when the engine is not warmed up.

The memory of the control unit 7 stores a first operation line A and a second operation line B which may consist of predetermined operation lines on the map as shown in FIGS. 3 and 4. The first operation line A and the second operation line B correspond to a first operating condition and a second operating condition which are predetermined.

The first operation line A is pre-selected as an operation line along which the fuel consumption rate defined as the fuel consumption per unit power output is minimized as shown in FIG. 3. The second operation line B is pre-selected as an operation line along which the emission of particulate matter (PN) is minimized when the engine is not warmed up or when the engine temperature is low as shown in FIG. 4. Therefore, for a given power output, the first operating condition allows the fuel consumption rate to be lower than that of the first second operating condition. And, for a given power output, the second operating condition allows the emission of particulate matter to be lower than that of the first operating condition.

As shown in FIGS. 3 and 4, the first operation line A coincides with the second operation line B in a range where the torque is equal to or less than a torque threshold value Tth (or the power output is equal to or less than a power threshold value Pth or the rotational speed is lower than a rotational threshold value Rth). Beyond this point, the first operation line A and the second operation line B provide different output characteristics such that the first operation line A produces more torque than the second operation line B for a given rotational speed. FIGS. 3 and 4 also show a boundary line X separating a stable region and an unstable region of the engine 2. When the torque is higher than the boundary line X, the engine 2 is enabled to operate in a stable manner. Both the first operation line A and the second operation line B are located in the stable region (higher torque region than the boundary line X) over the entire operating range.

The mode of operation of the hybrid vehicle 1 having the control unit 7 according to the present embodiment will be described in the following. Upon a start up of the engine 2, the hybrid vehicle 1 operates typically in the EV mode in which the motor 3 is driven mainly by using electric power from the battery 6 to drive the drive shaft 77. When the hybrid vehicle 1 is traveling in the EV mode, the engine 2 is not in operation.

The operation mode of the hybrid vehicle 1 is switched from the EV mode to the HV mode typically when there is an acceleration request from the driver and/or when the state of charge of the battery 6 is low.

When the operation mode is switched from the EV mode to the HV mode or when the engine is otherwise started, the engine temperature may be initially low so that particulate matter may be emitted from the engine at a relatively high level. Therefore, the control unit 7 selects the second operating condition as the operating condition of the engine 2 when the engine temperature is equal to or lower than a prescribed temperature determination value. When the torque is equal to or less than the torque threshold value Tth or the power output is equal to or less than the power threshold value Pth, there is no difference between the first operating condition and the second operating condition.

When the engine temperature is higher than the temperature determination value, the operating condition of the engine 2 may be switched from the second operating condition to the first operating condition because a higher fuel economy can be accomplished without undesired emission of particulate matter. However, if the operation condition is switched when the torque is greater than the torque threshold value Tth or the power output is higher than the power threshold value Pth, because of the different power output characteristics that are demonstrated under the first operating condition and the second operating condition, the engine output property undergoes a sudden change (in the rotational speed and/or the torque of engine 2).

To overcome this problem, according to the illustrated embodiment, the switch over between the first operating condition and the second operating condition is suppressed or prohibited when the torque is greater than the torque threshold value Tth or the power output is greater than the power threshold value Pth. The switch over is postponed until the torque becomes equal to or less than the torque threshold value Tth or the power output becomes equal to or less than the power threshold value Pth provided that the engine temperature continues to be higher than the temperature determination value. Thereby, a sudden change in the power output property of the engine 2 can be avoided at the time of switching over the operating condition.

When the operation mode is switched from the EV mode to the HV mode, the crankshaft 13 is connected to the rotary shaft 75 of the generator 4 via the gear train. All of the torque generated in the engine 2 is transmitted to the generator 4 and converted into electric energy. The motor 3 is driven by using the electric energy converted by the generator 4 and the electric energy supplied from the battery 6, and the torque of the motor 3 is transmitted to the drive shaft 77.

Thereafter, in the HV mode, the control unit 7 selects the operating condition at a regular time interval, performs the necessary processing for obtaining the required power output, and controls the operating condition of the engine 2 accordingly. The process of selecting the operating condition (operating condition selection process) is described in detail with reference to the flowchart shown in FIG. 5.

In the operating condition selection process, first of all, the control unit 7 determines whether the target torque set before the initiation of the operating condition selection process is equal to or less than the torque threshold value Tth (step ST1). If the target torque is equal to or less than the torque threshold value Tth, step ST2 is executed. Otherwise the operating condition selection process is concluded without changing the operating condition.

In step ST2, the control unit 7 detects the engine temperature based on the output of the engine temperature sensor 60, and determines whether the engine temperature is equal to or lower than a prescribed temperature determination value. When the engine temperature is not higher than the temperature determination value, step ST3 is executed. When the engine temperature is higher than the temperature determination value, step ST4 is executed.

In step ST3, the control unit 7 selects the first second operating condition as the operating condition of the engine 2. If the first operating condition was initially selected, the operating condition is changed to the second operating condition. If the second operating condition is already selected, the operating condition is maintained at the second operating condition. In either case, the second operation line B is selected as the operation line of the engine 2. After the selection is completed, the control unit 7 ends the operating condition selection process.

In step ST4, the control unit 7 selects the first operating condition as the operating condition of the engine 2. If the second operating condition was initially selected, the operating condition is changed to the first operating condition. If the first operating condition is already selected, the operating condition is maintained at the first operating condition. In either case, the first operation line A is selected as the operation line of the engine 2. After the selection is completed, the control unit 7 ends the operating condition selection process.

After (or at the same time as) the conclusion of the operating condition selection process, the control unit 7 sets the target torque output. After setting the target torque output, the control unit 7 obtains an intersection (target operating point) between the operation line and the line corresponding to the requested output torque on the map. Based on the obtained target operating point, the control unit 7 controls the load (the torque of the rotary shaft 75, etc.) of the generator 4, so that the rotational speed and the torque of the engine 2 are set as the target rotational speed and the target torque, respectively, and the operating point represented by the torque and the rotational speed of the engine 2 is determined as the position of the target operating point.

The effect of the hybrid vehicle 1 equipped with the control unit 7 according to the present embodiment is discussed in the following. Immediately after switching to the HV mode, the required output of the engine 2 is typically low, and the second operating condition (the second operation line B) is selected as the operating condition. Thereafter, the engine temperature rises higher than the temperature determination value. At this time, if the torque is greater than the torque threshold value Tth or the power output is higher than the power threshold value Pth, the operating condition is maintained at the second operating condition (the second operation line B). As soon as the torque becomes equal to or less than the torque threshold value Tth or the power output becomes equal to less than the power threshold value Pth, the operating condition is switched to the first operating condition (the first operation line A).

If the torque is equal to or less than the torque threshold value Tth or the power output is equal to or less than the power threshold value Pth when the engine temperature has risen higher than the temperature determination value, the operating condition is immediately switched to the first operating condition (the first operation line A).

It is possible that the engine temperature falls below the temperature determination value during the operation of the engine 2. Even in such a case, as soon as the engine temperature falls below the temperature determination value, the operating condition is switched to the second operating condition at the first appropriate time point (where the torque is equal to or less than the torque threshold value Tth or the power output is equal to or less than the power threshold value Pth). At any event, the switching of the operation line between the first operation line A and the second operation line B is performed only when the target torque is equal to or less than the torque threshold value Tth.

Although the present invention has been described in terms of a preferred embodiment thereof, it is obvious to a person skilled in the art that various alterations and modifications are possible without departing from the scope of the present invention defined by the claims.

For instance, as the engine temperature sensor 60, an in-cylinder temperature sensor 61 for detecting the gas temperature in the cylinder, an intake air temperature sensor 62 for detecting the intake air temperature passing through the intake pipe 16, an oil temperature sensor 64 for detecting the temperature of the lubricating oil, a cylinder block temperature sensor 65 that detects the temperature of the cylinder block 11, an outside air (ambient) temperature sensor 66 for detecting the temperature of the surrounding part of the internal combustion engine, and an exhaust temperature sensor 67 may be used.

The engine temperature may also be estimated from the operating condition of the engine (including the history thereof), instead of measuring the temperature directly.

In the illustrated embodiment, the second operation condition was selected with the aim of reducing emission of particulate matter even at the expense of fuel economy. However, other considerations such as the emission of NOx and/or hydrocarbons may also be used as a basis for selecting the second operating condition.

Also, instead of using two different operation lines, three or more operation lines may be defined so that the transition may be performed in a smoother manner.

The invention claimed is:

1. A hybrid vehicle, comprising:
   an internal combustion engine;
   an electric generator configured to be driven by the engine;
   a battery electrically connected to the electric generator;
   an electric motor configured to be driven by the electric generator and/or the battery, and to drive a driven wheel of the vehicle;
   an engine temperature sensor for measuring or estimating a temperature of the engine; and
   a control unit for controlling a load of the electric generator to operate the engine, according to a predetermined operating condition defined by a rotational speed and a torque of the engine;
   wherein the operating condition includes a first operating condition and a second operating condition that coincides with the first operating condition when the torque is equal to or lower than a prescribed torque determination value,
   wherein the control unit switches the operating condition from the first operating condition to the second operating condition when, in a case where the operating condition is the first operating condition, the temperature of the engine becomes equal to or lower than a prescribed temperature determination value and the torque is equal to or lower than the prescribed torque determination value, and
   wherein the control unit switches the operating condition from the second operating condition to the first operating condition when, in a case where the operating condition is the second operating condition, the temperature of the engine becomes higher than the prescribed temperature determination value and the torque is equal to or lower than the prescribed torque determination value.

2. The hybrid vehicle according to claim 1, wherein the engine temperature sensor comprises a cooling water temperature sensor for measuring a temperature of cooling water exiting from a region surrounding a cylinder of the engine.

3. The hybrid vehicle according to claim 1, wherein the engine temperature sensor comprises a sensor for measuring or estimating a combustion temperature of a cylinder of the engine.

4. The hybrid vehicle according to claim 1, wherein the engine temperature sensor comprises at least one of a temperature sensor for detecting a temperature of gas in a cylinder of the engine, a temperature sensor for detecting a temperature of cooling water of the engine, a temperature sensor for detecting a temperature of a main body of the engine, a temperature sensor for detecting a temperature of lubricating oil of the engine, a temperature sensor for detecting a surrounding part of the engine and a temperature sensor for detecting a temperature of exhaust gas of the engine.

5. The hybrid vehicle according to claim 1, wherein the first operating condition is selected as an operating condition that optimizes a fuel economy of the engine for a given power output.

6. The hybrid vehicle according to claim 1, wherein the second operating condition is selected as an operating condition that minimizes emission of particulate matter for a given power output when the engine is not yet warmed up.

* * * * *